United States Patent
Kim et al.

(10) Patent No.: US 7,409,225 B2
(45) Date of Patent: Aug. 5, 2008

(54) DUAL CONNECTION DEVICE FOR MEMORY MEDIUMS AND MOBILE COMMUNICATION TERMINALS WITH THE SAME

(75) Inventors: Yong Pil Kim, Gyeonggi-do (KR); Yong Jin Kim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 523 days.

(21) Appl. No.: 11/050,802

(22) Filed: Feb. 7, 2005

(65) Prior Publication Data

US 2005/0233763 A1    Oct. 20, 2005

(30) Foreign Application Priority Data

| Feb. 18, 2004 | (KR) | ................ 10-2004-0010780 |
| Feb. 27, 2004 | (KR) | ................ 20-2004-0005194 |
| Apr. 16, 2004 | (KR) | ................ 10-2004-0026077 |
| Apr. 16, 2004 | (KR) | ................ 10-2004-0026079 |
| Aug. 10, 2004 | (KR) | ................ 10-2004-0062872 |

(51) Int. Cl.
*H04B 1/38* (2006.01)
(52) U.S. Cl. ............... 455/558; 455/575.1; 379/433.09; 439/637
(58) Field of Classification Search ......... 439/630–637, 439/495; 379/433.06–433.12, 433.01, 433.05; 455/550.1, 556.1, 2, 557, 550, 558, 575.1
See application file for complete search history.

(56) References Cited

U.S. PATENT DOCUMENTS

| 5,436,969 | A  | * | 7/1995  | Kobayashi ............. 379/433.09 |
| 5,933,328 | A  |   | 8/1999  | Wallace et al. |
| 6,062,887 | A  |   | 5/2000  | Schuster et al. |
| 6,468,101 | B2 | * | 10/2002 | Suzuki ....................... 439/326 |
| 6,865,086 | B2 | * | 3/2005  | Gochnour et al. ............ 361/737 |
| 6,954,653 | B2 | * | 10/2005 | Morita ..................... 455/550.1 |
| 6,970,359 | B2 | * | 11/2005 | Gochnour et al. ............ 361/737 |
| 7,021,969 | B2 | * | 4/2006  | Matsunaga .................. 439/630 |

FOREIGN PATENT DOCUMENTS

| EP | 1 213 680 A2 | 6/2002 |
| WO | WO 00/17806 | 3/2000 |

* cited by examiner

*Primary Examiner*—Edward Urban
*Assistant Examiner*—Nhan T. Le
(74) *Attorney, Agent, or Firm*—Dickstein Shapiro LLP (57) ABSTRACT

Dual connection device for memory mediums and a mobile communication terminal including the same. The dual connection device has a body portion electrically connected with a mobile communication terminal, a first receiving portion formed to the body portion for receiving therein a first memory medium, a second receiving portion formed to the body portion as to be arranged piled up to the first receiving portion for receiving therein a second memory medium, a first connection terminal installed in the first receiving portion so as to be electrically connected with a terminal of the first memory medium, and a second connection terminal installed in the second receiving portion so as to be electrically connected with a terminal of the second memory medium.

22 Claims, 8 Drawing Sheets

DUAL CONNECTION DEVICE FOR MEMORY MEDIUMS AND MOBILE COMMUNICATION TERMINALS WITH THE SAME

CROSS-REFERENCE TO RELATED APPLICATIONS

This application claims all benefits of Korean Patent Applications No. 2004-10780 filed on Feb. 18, 2004, No. 2004-26077 filed on Apr. 16, 2004, No. 2004-26079 filed on Apr. 16, 2004, No. 2004-62872 filed on Aug. 10, 2004, and Korean Utility Model Application No. 2004-5194 filed on Feb. 27, 2004 in the Korean Intellectual Property Office, the disclosures of which are incorporated herein by reference.

BACKGROUND OF THE INVENTION

1. Field of the Invention

The present invention relates to a dual connection device for memory mediums and mobile communication terminals with the same, and more particularly to a dual connection device for memory mediums and mobile communication terminals with the same, in which connection devices that had been separately constituted in a mobile communication terminal as to respectively connect various corresponding memory mediums, are formed into an integrated one, making the mobile communication terminal have a slim and compact size and accomplishing a simplified assembly process.

2. Description of the Prior Art

Generally known in the art, mobile communication terminals include memory mediums for authentication of personal information and credit settlement or for storage of data upon using of various kinds of contents, and connection devices that are independent to each other, each connecting the corresponding memory medium.

In considering such memory mediums, first, memory mediums for authentication include Subscriber Identification Module (SIM) cards, R-User Identity Module (R-UIM) cards, Moneta cards, Bank-On cards and the like.

Meanwhile, memory mediums for storage of data in use of various kinds of contents include Mini Secure Digital (SD) cards, Smart Media cards, Memory Stick, eXtreme Digital (XD) Picture cards, Compact Flash cards and the like.

In case of memory mediums for authentication, in order to reduce a risk of loss, the connection device thereof is installed partially exposed at a back face of the mobile communication terminal to which a battery pack is attached. In this case, if the battery pack is not detached from the mobile communication terminal, memory medium for authentication cannot be replaced.

Also, in case of the memory medium for storage of data, the connection device thereof is disposed exposed at a side of the mobile communication terminal so as to directly replace the same at that place.

Thus, in the prior art, the connection devices for authentication and for storage of data have been respectively fabricated and installed to the corresponding place of mobile communication terminal. Herein, the connection devices have been respectively and separately installed so that it has required wider installing space and area, making it difficult to accomplish a slim and compact size of the mobile communication terminal causing also a problem in that installing of other parts for additional new function is difficult.

Further, if the connection devices are separately fabricated, an assembly process will be naturally complicated to reduce productivity because of being hardly obtained a reduction of assembly time and to increase fabrication costs due to increased assembly processes.

SUMMARY OF THE INVENTION

Accordingly, the present invention is directed to overcome the above-mentioned disadvantages or limitations occurring in the prior art.

It is an object of the present invention to provide a dual connection device for memory mediums and mobile communication terminals with the same, in which connection devices for connecting various corresponding memory mediums with mobile communication terminals are formed into an integrated one, making the mobile communication terminal have a slim and compact size, accomplishing a simplified assembly process, and obtaining increased productivity and cost reduction due to simplification of assembly process.

In order to accomplish this object of the present invention, there is provided a dual connection device for memory mediums, the connection device comprising:

a body portion electrically connected with a mobile communication terminal;

a first receiving portion formed to the body portion for receiving therein a first memory medium;

a second receiving portion formed to the body portion as to be arranged piled up to the first receiving portion for receiving therein a second memory medium;

a first connection terminal so as to be electrically connected with a terminal of the first memory medium received in the first receiving portion; and a second connection terminal so as to be electrically connected with a terminal of the second memory medium received in the second receiving portion.

Herein, the first and second connection terminals are formed in a space between the first and second receiving portions piled up each other.

Also, a partition plate is formed in the space between the first and second receiving portions and which has at least one through-hole, the first connection terminal is installed to extend from a sidewall of the body portion corresponding to the terminal of the first memory medium, and the second connection terminal is installed to extend from a side surface of the through-hole or the sidewall of the body portion corresponding to the terminal of the second memory medium.

Preferably, the dual connection device further comprises first and second connection lead terminals electrically connected with the first and second connection terminals, respectively, and installed to be protruded in a certain length from the body portion so as to electrically connect the body portion and the mobile communication terminal.

Meanwhile, the first receiving portion includes an opening formed to one side of the body portion and a receiving space formed in the body portion to be communicated with the opening, and the second receiving portion is formed on an upper surface of the body portion and includes a plurality of guide engagement members installed spaced apart and opposite to each other on the upper surface of the body portion so as to guide the movement of the second memory medium.

Alternatively, the dual connection device further comprises a partition plate installed in the body portion to define the first and second receiving portions into the higher and lower receiving portions, in which the first and second receiving portion are formed in recessed shapes on the lower and upper surfaces, respectively, of the body portion about the partition plate.

Preferably, the dual connection device further comprises a plurality of through-holes formed in parallel onto the partition plate, the first connection terminal is installed to extend from the inner sidewall of the body portion toward the first receiving portion such that a contact thereof is formed with a height substantially identical to the lower surface of the partition plate upon the electrical connection of the first connection terminal with the terminal of the first memory medium, and the second connection terminal is installed to extend from the side surface of the through-hole toward inside the through-hole such that a contact thereof is formed with a height substantially identical to the upper surface of the partition plate upon the electrical connection of the second connection terminal with the terminal of the second memory medium.

Preferably, the dual connection device further comprises a plurality of through-holes formed in parallel onto the partition plate, the first connection terminal is installed to extend from the inner sidewall of the body portion toward the first receiving portion such that a contact thereof is formed with a height substantially identical to the lower surface of the partition plate upon the electrical connection of the first connection terminal with the terminal of the first memory medium, and the second connection terminal consists of the plural connection terminals, some of which are installed to extend from the side surface of the through-hole toward inside the through-hole and the others are installed to extend from the inner sidewall of the body portion toward the second receiving portion such that contacts thereof are formed with a height substantially identical to the upper surface of the partition plate upon the electrical connection of the second connection terminals with the terminals of the second memory medium.

Preferably, the dual connection device further comprises a cover being installed on the second receiving portion so as to fix the second memory medium to stably connect the terminal of the second memory medium with the second connection terminal of the second receiving portion.

Herein, the first and second receiving portions are respectively formed in a direction intersecting to each other so that the first and second memory mediums are intersected and received in the first and second receiving portions, respectively, and alternatively, the first and second receiving portions are respectively formed in a direction parallel to each other so that the first and second memory mediums are received parallel and opposite to each other in the first and second receiving portions, respectively.

Also, the first memory medium is a memory medium for storage of external data, and the second memory medium is a memory medium for authentication of personal information and credit settlement.

In order to accomplish the object of the present invention, according to another aspect of the present invention, there is provided a mobile communication terminal, including a dual connection device for memory mediums, the connection device comprising:

a body portion electrically connected with a mobile communication terminal;

a first receiving portion formed to the body portion for receiving therein a first memory medium;

a second receiving portion formed to the body portion as to be arranged piled up to the first receiving portion for receiving therein a second memory medium;

a first connection terminal so as to be electrically connected with a terminal of the first memory medium received in the first receiving portion; and a second connection terminal so as to be electrically connected with a terminal of the second memory medium received in the second receiving portion.

Herein, the first and second connection terminals are formed in a space between the first and second receiving portions piled up each other.

Also, a partition plate is formed in the space between the first and second receiving portions and which has at least one through-hole, the first connection terminal is installed to extend from a sidewall of the body portion corresponding to the terminal of the first memory medium, and the second connection terminal consists of the plural connection terminals, each being installed to extend from a side surface of the through-hole or the same side surface and the sidewall of the body portion corresponding to the terminal of the second memory medium.

Preferably, the dual connection device further comprises first and second connection lead terminals electrically connected with the first and second connection terminals, respectively, and installed to be protruded in a certain length from the body portion so as to electrically connect the body portion and the mobile communication terminal.

Preferably, the dual connection device is installed so that the first receiving portion is exposed at a side of the mobile communication terminal and the second receiving portion is exposed at a back surface of the mobile communication terminal.

Preferably, the dual connection device is located on the printed circuit board in the mobile communication terminal, the first receiving portion being exposed through the sidewall of the mobile communication terminal and the second receiving portion being exposed through the back cover of the mobile communication terminal without a battery pack.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 1:
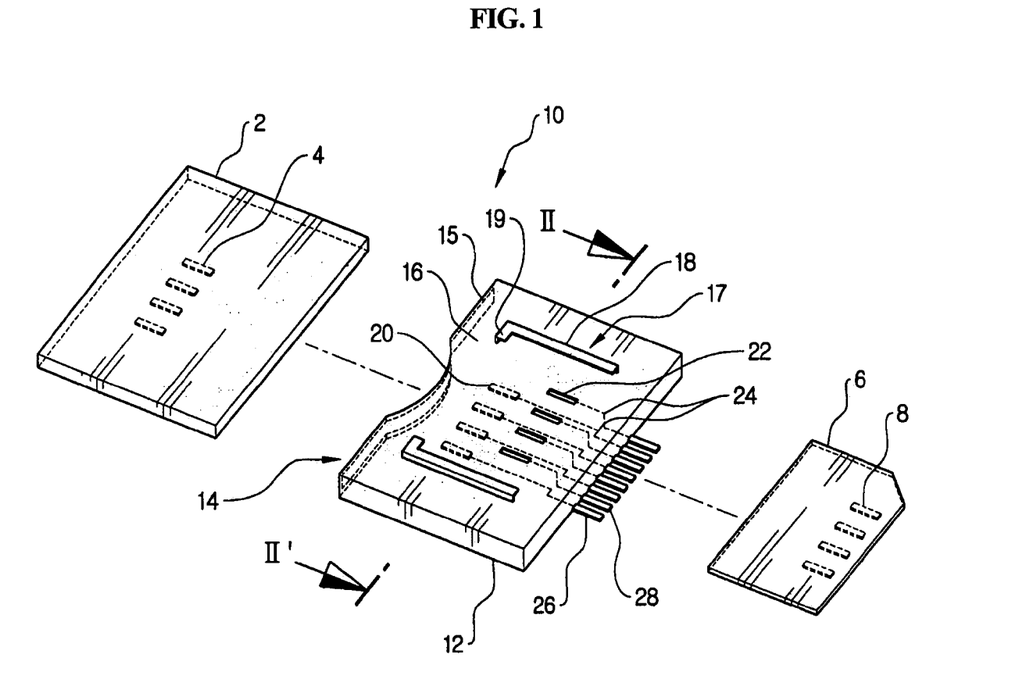
FIG. 1 is a perspective view of a dual connection device for memory mediums according to an embodiment of the present invention.
Figure 2:
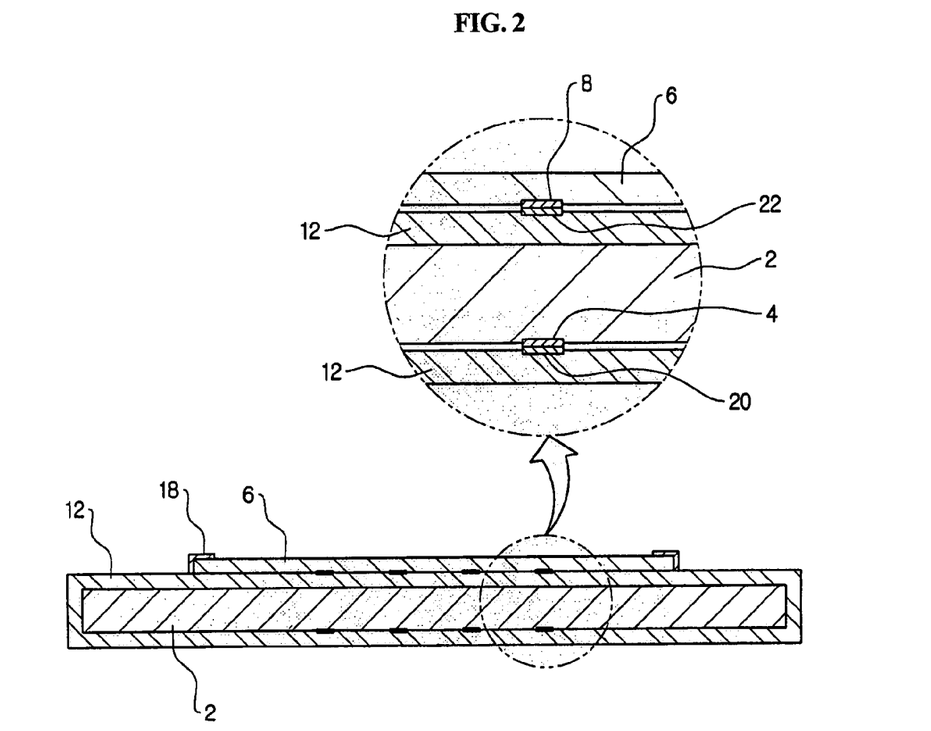
FIG. 2 is a cross-sectional view taken along a line II-II' of FIG. 1.

FIG. 1 is a perspective view of a dual connection device 10 for memory mediums according to an embodiment of the present invention, FIG. 2 is a cross-sectional view taken along a line II-II' of FIG. 1.

Referring to FIGS. 1 and 2, the dual connection device 10 of the present invention includes a box-shaped body portion 12 with its one end opened. A first memory medium 2 and a second memory medium 6 are respectively adapted to the body portion 12. Terminals 4 and 8 made of a conductive material such as metal are formed on a lower surface of the first and second memory mediums 2 and 6, respectively, for electrical connection with the body portion 12.

A first receiving portion 14 is formed in the body portion 12 so as to receive the first memory medium 2. Considering that the terminal 4 is made of a conductive material such as metal, the body portion 12 is preferably formed of insulating materials. Meanwhile, it may be possible to form the body portion 12 to be of conductive material such as metal and to form a cover made of insulating material for covering the surface of the body portion 12.

The first receiving portion 14 includes an opening 15 formed at a side of the body portion 12, and a receiving space 16 formed in the body portion 12 as to be communicated with the opening 15. The size and the shape of the opening 15 are determined corresponding to those of the first memory medium 2. Like this, the size and shape of the receiving space 16 and the body portion 12 are determined corresponding to those of the first memory medium 2 to be received in the receiving space 16, so that the size and the shape thereof are not limited to those of the drawings illustrated.

A plurality of first connection terminals 20 are installed on an inner surface of the receiving space 16 at a position corresponding to the terminal 4 of the first memory medium 2. The first connection terminal 20 is protruded by a certain height from the inner surface of the receiving space 16, so that when the first memory medium 2 is inserted into the receiving space 16, the first connection terminal 20 becomes to be in contact with the terminal 4 of the first memory medium 2, electrically connecting the first memory medium 2.

A second receiving portion 17 is formed on the body portion 12 so as to receive the second memory medium 6. The second receiving portion 17 includes a guide engagement member 18 for guiding the movement of the second memory medium 6 to position the same at an accurate position when the second memory medium 6 being received. Preferably, a pair of guide engagement members 18 are installed spaced apart corresponding to a width of the second memory medium 6 and opposite to each other on the body portion 12. The guide engagement member 18 has a cross-sectional shape covering a part of the side surface and upper surface of the second memory medium 6, so that it guides the movement of the second memory medium 6. A stopper 19 is formed at one end of the guide engagement member 18 for restricting the movement of the second memory medium 6. When a leading end of the second memory medium 6 becomes to be in contact with the stopper 19, the terminal 8 of the second memory medium 6 is positioned on a plurality of second connection terminals 22 protruded on the body portion 12, electrically connecting the second connection terminals 22. The guide engagement member 18 may be integrally formed on the body portion 12 or otherwise be detachably thereon installed by a clamp such as bolt, or an interference-fit.

Although FIGS. 1 and 2 illustrate that the first and second memory mediums 2 and 6 are received in the body portion 12 in opposite horizontal directions, it only shows one embodiment of the present invention so that the present invention cannot be thereto limited. That is, the guide engagement member 18 of the second receiving portion 17 may be arranged so that the second memory medium 6 being received in a direction intersecting the first memory medium 2, and besides this, is arranged in various methods.

Meanwhile, the second connection terminal 22 is protruded by a certain height from the upper surface of the body portion 12, so that when the second memory medium 6 is positioned in the second receiving portion 17, it is electrically connected with the terminal 8 of the second memory medium 6.

The first and second connection terminals 20 and 22 are connected with first and second connection lead terminals 26 and 28, respectively, through leading wires 24 embedded along a inside of the body portion 12. The leading wires 24 are preferably arranged in a direction or location that they do not short-circuit together.

Figure 3:
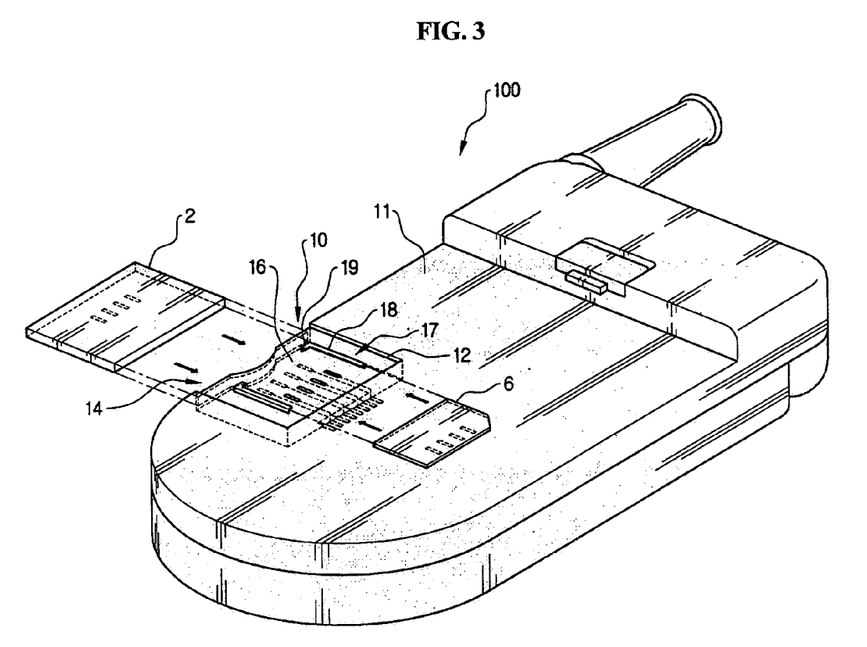
FIG. 3 is a perspective view showing a state that the dual connection device of FIG. 1 is adapted to a mobile communication terminal.

The first and second connection lead terminals 26 and 28 are installed extending outside by a certain length from the body portion 12, thus being connected with a mobile communication terminal 100 (see FIG. 3). Although FIG. 1 illustrates that the first and second lead terminals 26 and 28 all are installed to one side of the body portion 12, they can be respectively installed to the different sides of the body portion 12.

FIG. 3 is a perspective view showing a state that the dual connection device 10 of FIG. 1 is adapted to a mobile communication terminal 100.

Referring to FIG. 3, the dual connection device 10 for memory mediums is installed to a back surface 11 of the mobile communication terminal 100 with a battery pack thereof (not shown) removed. In this case, the dual connection device 10 is positioned so that the first receiving portion 14 is opened toward a side of the mobile communication terminal 100 and the second receiving portion 17 is exposed at the back surface 11 of the mobile communication terminal 100.

Thus, when users intend to replace the first memory medium 2, the first memory medium 2 is drawn from or inserted into the receiving space 16 through the opening 15 of the first receiving portion 14 positioned at the side of the mobile communication terminal 100, directly replacing the first memory medium 2.

Also, when users intend to replace the second memory medium 6, the battery pack (not shown) is firstly separated to expose the second receiving portion 17 of the dual connection device 10 for memory mediums, and the second memory medium 6 is then pushed into or pulled from the guide engagement members 18 provided on the upper surface of the body portion 12, finally replacing the second memory medium 6.

Herein, the guide engagement members 18 contact both ends and upper surface of the second memory medium 6 to guide the second memory medium 6 not to be detached. Also, the stopper 19 provided at one end of the guide engagement member 18 accurately determines a connecting position of the second memory medium 6, preventing connection defects.

Figure 4:
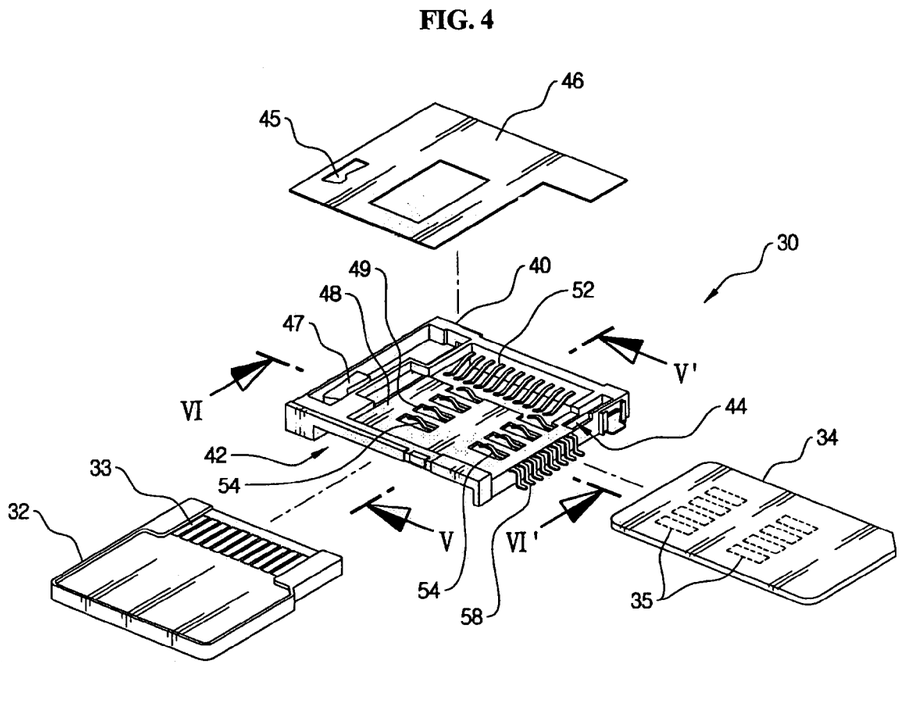
FIG. 4 a perspective view of a dual connection device for memory mediums according to another embodiment of the present invention.

FIG. 4 is a perspective view of a dual connection device 30 for memory mediums according to another embodiment of the present invention.

Referring to FIG. 4, the dual connection device 30 of this embodiment includes a body portion 40 in which first and second memory mediums 32 and 34 are received at the same time.

Considering that a terminal 33 of the first memory medium 32 is made of a conductive material such as metal, the body portion 40 is preferably formed of insulating materials. Meanwhile, it may be possible to form the body portion 40 to be of conductive material such as metal and to form a cover made of insulating material for covering the surface of the body portion 40.

The body portion 40 includes a first receiving portion 42 for receiving the first memory medium 32, a second receiving portion 44 for receiving the second memory medium 34, and a partition plate 48 for defining the first and second receiving portions 42 and 44 into the higher and lower portions. About the partition plate 48, the first receiving portion 42 is formed in a recessed shape in a lower surface of the body portion 40, and the second receiving portion 44 is formed in a recessed shape in an upper surface of the body portion 40. The first and second memory mediums 32 and 34 are received in the body portion 40 as to be piled up to the upper and lower portions of the body portion 40. In this case, the first and second receiving portions 42 and 44 are formed so that the first and second memory mediums 32 and 34 are intersected to each other. The size and shape of the first and second receiving portions 42 and 44 are determined corresponding to those of the first and second memory mediums 32 and 34, so that the size and the shape thereof are not limited to those of the drawings illustrated.

In order to securely connect a terminal 35 of the second memory medium 34 with a second connection terminal 54 provided to the second receiving portion 44, a cover 46 is installed on the upper portion of the second receiving portion 44 for fixing the second memory medium 34. The cover 46 is formed of insulating material like the body portion 40, and is detachably installed to the body portion 40 by means of a clamp not shown. As such clamp, for example, engaging groove and hook may be adapted, or the clamp means known in the art may be selected. Also, the cover 46 may be integrally formed with the body portion 40.

The partition plate 48 is constituted so that a contact or an interference between the first and second memory mediums 32 and 34 may not be generated. The partition plate 48 may be formed to completely divide the first and second receiving portions 42 and 44 or to partially communicate with the first and second receiving portions 42 and 44 as shown in FIG. 4.

A plurality of first connection terminals 52 are installed to the first receiving portion 42 at a position corresponding to a terminal 33 of the first memory medium 32. The first connection terminals 52 are electrically connected with the terminals 33 of the first memory medium 32. The first connection terminal 52 is formed to be protruded inside the first receiving portion 42 by a certain length from the inner sidewall of the body portion 40. To be concrete, the first connection terminal 52 is formed of metallic material with its free end having a downward bent side profile describing a parabola, so that the connection terminal has a tension force against upward pushing force. Herein, in order to minimize the whole thickness of the connection device 30, the first connection terminal 52 is installed to an inner sidewall of the body portion 40 such that a contact thereof is of a height substantially identical to the lower surface of the partition plate 48 upon the electrical connection of the first connection terminal 52 with the first memory medium 32.

Meanwhile, a hook 47 is installed at one side of the first receiving portion 42, and a resilient member (not shown) is installed in the first receiving portion 42 so as to resiliently bias the first memory medium 32 against an insertion force when it is inserted into the first receiving portion. When the first memory medium 32 is to be inserted into the first receiving portion 42, operators inserts the first memory medium 32 against a resilient force of the resilient member (not shown) so that a latch groove (not shown) formed at one side of the first memory medium 32 is engaged with the hook 47, fixing the first memory medium 32 into the first receiving portion 42. When it is to be disconnected from the first receiving portion 42, the hook 47 is forced to be pressed so that the hook 47 is disengaged from the latch groove (not shown) of the first memory medium 32, thus disconnecting the first memory medium 32 from the first receiving portion 42 by use of a resilient force of the resilient member (not shown).

Figure 5:
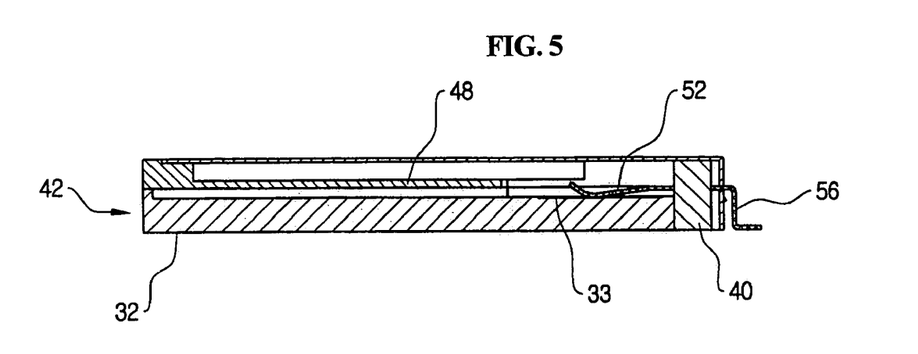
FIG. 5 is a cross-sectional view taken along a line V-V' of FIG. 4.

FIG. 5 is a cross-sectional view taken along a line V-V' of FIG. 4, which shows a connection state of the first connection terminal 52 and the terminal 33 of the first memory medium 32 when the first memory medium 32 is received in the first receiving portion 42.

Referring to FIG. 5, when the first memory medium 32 is received in the first receiving portion 42, the first memory medium 32 pushes the leading end (i.e. free end) of the first connection terminal 52 upward so that the first connection terminal 52 is slightly bent to exert a tension downward. Such tension allows the first connection terminal 52 to press the terminal 33 of the first memory medium 32, preventing connection defects due to coming-off of the first connection terminal 52. Also, as described before, the first connection terminal 52 becomes to be in contact with the terminal 33 of the first memory medium 32 at a height substantially identical to the lower surface of the partition plate 48.

Figure 7:
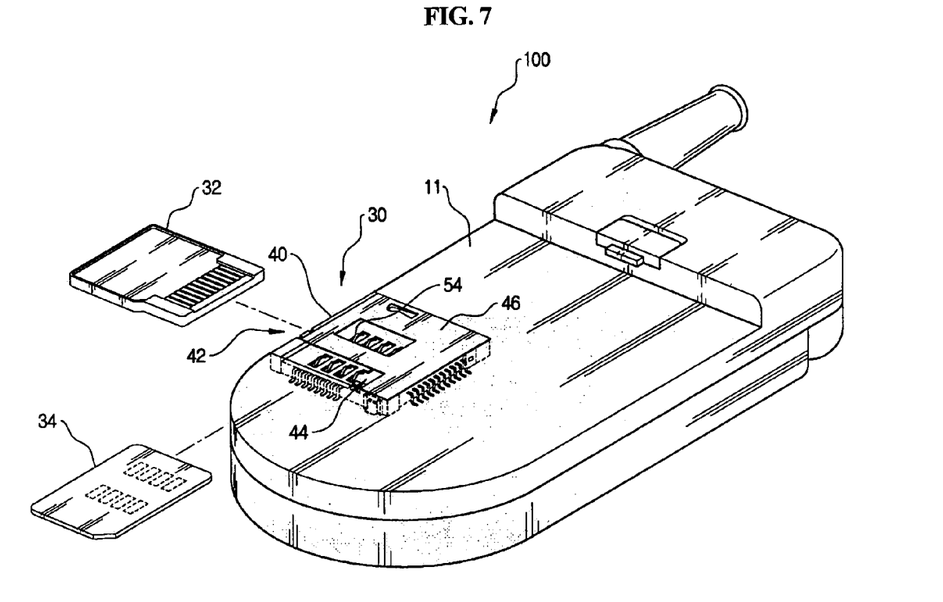
FIG. 7 is a perspective view showing a state that the dual connection device of FIG. 4 is adapted to a mobile communication terminal.

The other end (i.e., fixed end) of the first connection terminal 52 extends through the sidewall of the body portion 40, being connected with a first connection lead terminal 56, which is to be electrically connected with a mobile communication terminal 100 (see FIG. 7). A plurality of first connection lead terminals 56 are installed extending a certain length from one side of the body portion 40 so as not to be interfered with each other.

Referring again to FIG. 4, a plurality of through-holes 49 are formed to the partition plate 48 at a position corresponding to the terminals 35 of the second memory medium 34, the through-holes being horizontally arranged spaced apart and parallel to each other. In the through-holes, the plural second connection terminals 54 are respectively installed so as to connect the terminals 35 of the second memory medium 34. The second connection terminals 54 have tensioning leading ends (i.e., free ends) extending upward and describing a parabola from the side surface of the through-hole 49 to inside the through-hole 49. Herein, in order to minimize the whole thickness of the connection device 30, the second connection terminal 54 is installed to the side surface of the through-hole 49 such that a contact thereof is of a height substantially identical to the upper surface of the partition plate 48 upon the electrical connection of the second connection terminal 54 with the second memory medium 34.

The present invention, however, is not limited to such construction in which the through-holes 49 are formed in the partition plate 48 and the second connection terminals 54 are installed in the through-holes. A construction may be adapted so that the second connection terminals 54 may be installed to a surface of the partition plate 48 without having the through-holes 49. A structure for the partition plate 48 and the second connection terminals 54 may be changed in the related art, and such changes fall within a scope of the present invention.

The other end (i.e., fixed end) of the second connection terminal 54 extends through the side surface of the partition plate 48, being connected with a second connection lead terminal 58, which is to be electrically connected with a mobile communication terminal 100. A plurality of second connection lead terminals 58 are installed extending a certain length from one side of the body portion 40 so as not to be interfered with each other.

Figure 6:
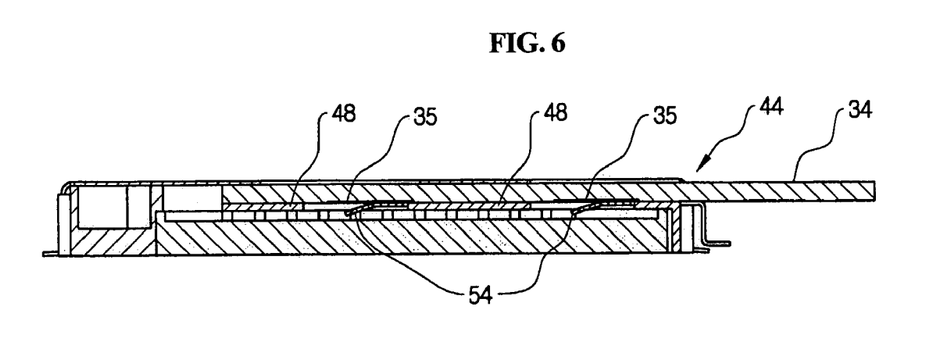
FIG. 6 is a cross-sectional view taken along a line VI-VI' of FIG. 4.

FIG. 6 is a cross-sectional view taken along a line VI-VI' of FIG. 4, which shows a connection state of the second connection terminal 54 and the terminal 35 of the second memory medium 34 when the second memory medium 34 is received in the second receiving portion 44.

Referring to FIG. 6, when the second memory medium 34 is received in the second receiving portion 44, the second memory medium 34 pushes the leading end (i.e. free end) of the second connection terminal 54 downward so that the second connection terminal 54 is slightly bent to exert a tension upward. Such tension allows the second connection terminal 54 to press the terminal 35 of the second memory medium 34, preventing connection defects due to coming-off of the second connection terminal 54. Also, as described before, the second connection terminal 54 becomes to be in contact with the terminal 35 of the second memory medium 34 at a height substantially identical to the upper surface of the partition plate 48.

Also, as shown in FIGS. 5 and 6, in order to minimize the whole thickness of the connection device 30, the first and second connection terminals 52 and 54 are connected with the first and second memory mediums 32 and 34, respectively, at a space between the first and second memory mediums 32 and 34 that corresponds to a thickness of the partition plate 48.

Although FIGS. 4 and 5 illustrate that the first and second connection lead terminals 56 and 58 are respectively protruded from the different sides of the body portion 40, the present invention is not thereto limited. For example, there may be provided a structure that the two terminals are protruded from the same side of the body portion 40. In this case, the first and second connection lead terminals 56 and 58 are preferably arranged so as not to be interfered or short-circuit with each other.

FIG. 7 is a perspective view showing a state that the dual connection device 30 of FIG. 4 is adapted to the mobile communication terminal 100.

Referring to FIG. 7, the dual connection device 30 for memory mediums is installed to the back surface 11 of the mobile communication terminal 100 with its battery pack (not shown) removed. In this case, the first receiving portion 42 of the connection device 30 is opened toward the side of the mobile communication terminal 100, and the second receiving portion 44 is positioned exposed at the back surface 11 of the mobile communication terminal 100.

In the mobile communication terminal 100 according to the embodiments of FIGS. 4 to 7, when users intend to replace the first memory medium 32, the first memory medium 32 is drawn from or inserted into the first receiving portion 42 of the body portion 40 opening toward the side of the mobile communication terminal 100, directly replacing the first memory medium 32.

Also, when users intend to replace the second memory medium 34, the battery pack (not shown) is firstly separated to expose the second receiving portion 44 of the body portion 40, and the second memory medium 34 is then pushed into or pulled from the second receiving portion 44, finally replacing the second memory medium 34.

Meanwhile, a cover 46 is coupled to the upper portion of the second receiving portion 44 so as to prevent the second memory medium 34 from being detached from the second receiving portion 44 or from being spaced apart from the second connection terminal 54, finally preventing connection defects.

Figure 8:
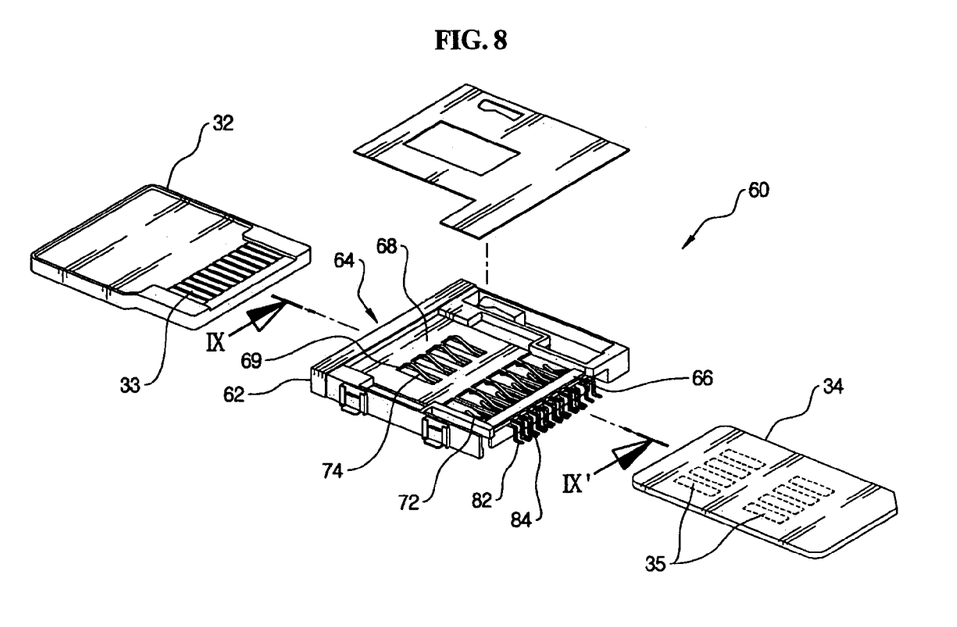
FIG. 8 a perspective view of a dual connection device for memory mediums according to still another embodiment of the present invention.

FIG. 8 is a perspective view of a dual connection device 60 for memory mediums according to still another embodiment of the present invention.

Referring to FIG. 8, the dual connection device 60 of this embodiment has the same construction as that of the dual connection device 30 of FIG. 4, only excluding that a structure of a first receiving portion 64 for receiving the first memory medium 32 and a second receiving portion 66 for receiving the second memory medium 34 is different, and that a position where some of the second connection terminals 74 connecting with the terminal 35 of the second memory medium 34 are installed is different. In the dual connection device 60 of this embodiment, the first and second receiving portions 64 and 66 are formed so that the first and second memory mediums 32 and 34 are received in opposite direction to each other. Also, like the embodiment of FIG. 4 described before, some of the plural second connection terminals 74 are installed to extend from the side surface of the plural through-holes 69 formed onto the partition plate 68 toward inside the through-hole 69, and the other second connection terminals are installed to extend from the inner sidewall of the body portion 62 toward the second receiving portion 66.

The first connection terminal 72 is installed to extend from the inner sidewall of the body portion 62 and becomes to be electrically connected with the terminal 33 of the first memory medium 33 at a height substantially identical to the lower surface of the partition plate 68. Also, the second connection terminal 74 installed at the side surface of the through-hole 69 and the inner sidewall of the body portion 62 becomes to be electrically connected with the terminal 35 of the second memory medium 34 at a height substantially identical to the upper surface of the partition plate 68.

In this case, preferably, the first connection terminals 72 and some of the second connection terminals 74 installed at the inner sidewall of the body portion 62 are properly arranged so as not to be interfered or short-circuit with each other. Although FIG. 8 illustrate that first and second connection lead terminals 82 and 84 connected with the first and second connection terminals 72 and 74, respectively, are formed at the same side of the body portion 62, it may be possible to form them at different sides of the body portion.

Figure 9:
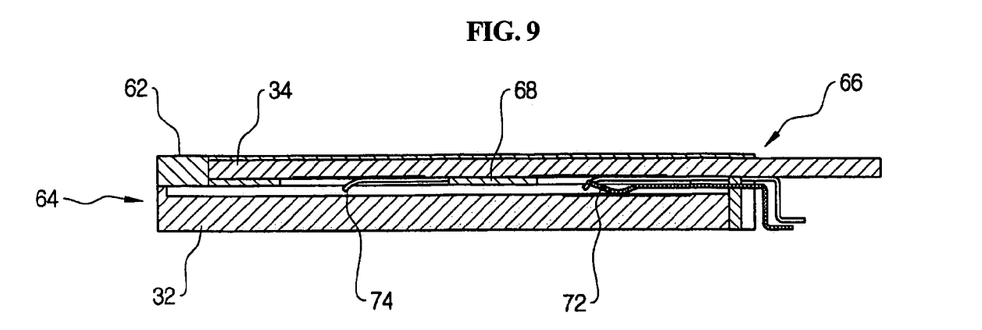
FIG. 9 is a cross-sectional view taken along a line IX-IX' of FIG. 8.

FIG. 9 is a cross-sectional view taken along a line IX-IX' of FIG. 8 and which shows a connection state of the first and second connection terminals 72 and 74 when the first and second memory mediums 72 and 74 are received in the first and second receiving portions 64 and 66, respectively.

Referring to FIG. 9, like the dual connection device 30 for memory medium of FIG. 4 described before, the first and second connection terminals 72 and 74 are connected, at their one ends, with the first and second memory mediums 32 and 34, respectively, at a space between the first and second memory mediums 32 and 34 that corresponds to a thickness of the partition plate 68. The other ends of the first and second connection terminals 72 and 74 extend through the body portion 62 to be connected with the first and second connection lead terminals 82 and 84.

As described before, according to the present invention, there is provided a dual connection device for memory mediums, in which the first connection terminal is installed to the sidewall of the body portion and the second connection terminal is installed to the side surface of the through-hole formed onto the partition plate so that a thickness of the partition plate is reduced. Also, the first and second connection terminals are connected with the first and second memory mediums at a space between the first and second memory mediums that corresponds to a thickness of the partition plate so that the whole thickness of the connection device is reduced, making the mobile communication terminal have a slim and compact size.

Also, according to the present invention, an installing space is enlarged in the mobile communication terminal so that parts for new function are easily installed thereto.

Also, according to the present invention, various kinds of connection devices are formed integrally so that a simplified assembly process is achieved, and increased productivity and cost reduction are accomplished.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A dual connection device for memory mediums comprising:
   a body portion electrically connected with a mobile communication terminal;
   a first receiving portion formed in the body portion for receiving therein a first memory medium;
   a second receiving portion formed in the body portion as to be arranged piled up to the first receiving portion for receiving therein a second memory medium;
   a first connection terminal so as to be electrically connected with a terminal of the first memory medium received in the first receiving portion; and
   a second connection terminal so as to be electrically connected with a terminal of the second memory medium received in the second receiving portions,
   wherein an upper surface of the body portion separates said first and second receiving portions.

2. The dual connection device as claimed in claim 1, wherein the first and second connection terminals are formed in a space between the first and second receiving portions piled up each other.

3. The dual connection device as claimed in claim 1, further comprising first and second connection lead terminals electrically connected with the first and second connection terminals, respectively, and installed such that the first and second connection lead terminals are protruded a certain length from the body portion so as to electrically connect the body portion and the mobile communication terminal.

4. The dual connection device as claimed in claim 1, wherein the first memory medium is a memory medium for storage of external data.

5. The dual connection device as claimed in claim 1, wherein the second memory medium is a memory medium for authentication of personal information and credit settlement.

6. A dual connection device for memory mediums comprising:
   a body portion electrically connected with a mobile communication terminal;
   a first receiving portion formed in the body portion for receiving therein a first memory medium;
   a second receiving portion formed in the body portion as to be arranged piled up to the first receiving portion for receiving therein a second memory medium;
   a first connection terminal so as to be electrically connected with a terminal of the first memory medium received in the first receiving portion; and
   a second connection terminal so as to be electrically connected with a terminal of the second memory medium received in the second receiving portion,
   wherein a partition plate is formed in a space between the first and second receiving portions and which has at least one through-hole,
   wherein the first connection terminal is installed to extend from a sidewall of the body portion corresponding to the terminal of the first memory medium, and
   wherein the second connection terminal is installed to extend from a side surface of the through-hole or the sidewall of the body portion corresponding to the terminal of the second memory medium.

7. A dual connection device for memory mediums comprising:
   a body portion electrically connected with a mobile communication terminal;
   a first receiving portion formed in the body portion for receiving therein a first memory medium;
   a second receiving portion formed in the body portion as to be arranged piled up to the first receiving portion for receiving therein a second memory medium;
   a first connection terminal so as to be electrically connected with a terminal of the first memory medium received in the first receiving portion; and
   a second connection terminal so as to be electrically connected with a terminal of the second memory medium received in the second receiving portion,
   wherein the first receiving portion includes an opening formed on one side of the body portion and a receiving space formed in the body portion, the receiving space being in communication with the opening, and
   wherein the second receiving portion is formed on the body portion and includes a pair of guide engagement members installed spaced apart and opposite to each other on the body portion so as to guide movement of the second memory medium.

8. A dual connection device for memory mediums comprising:
   a body portion electrically connected with a mobile communication terminal;
   a first receiving portion formed in the body portion for receiving therein a first memory medium;
   a second receiving portion formed in the body portion as to be arranged piled up to the first receiving portion for receiving therein a second memory medium;
   a first connection terminal so as to be electrically connected with a terminal of the first memory medium received in the first receiving portion;
   a second connection terminal so as to be electrically connected with a terminal of the second memory medium received in the second receiving portion; and
   a partition plate installed in the body portion to define the first and second receiving portions into higher and lower receiving portions, in which the first and second receiving portions are formed in recessed shapes on lower and upper surfaces, respectively, of the body portion with respect to the partition plate.

9. The dual connection device as claimed in claim 8, further comprising
   a plurality of through-holes formed in parallel onto the partition plate, the first connection terminal being installed to extend from an inner sidewall of the body portion toward the first receiving portion such that a contact thereof is formed with a height substantially identical to a lower surface of the partition plate upon electrical connection of the first connection terminal with the terminal of the first memory medium, and the second connection terminal is installed to extend from a side surface of the through-hole toward inside the through-hole such that a contact thereof is formed with a height substantially identical to an upper surface of the partition plate upon electrical connection of the second connection terminal with the terminal of the second memory medium.

10. The dual connection device as claimed in claim 8, further comprising
a plurality of through-holes formed in parallel onto the partition plate, the first connection terminal being installed to extend from an inner sidewall of the body portion toward the first receiving portion such that a contact thereof is formed with a height substantially identical to a lower surface of the partition plate upon electrical connection of the first connection terminal with the terminal of the first memory medium, and the second connection terminal consists of plural connection terminals, some of which are installed to extend from a side surface of the through-hole toward inside the through-hole and others are installed to extend from the inner sidewall of the body portion toward the second receiving portion such that contacts thereof are formed with a height substantially identical to an upper surface of the partition plate upon electrical connection of the second connection terminals with the terminals of the second memory medium.

11. The dual connection device as claimed in claim 8, further comprising a cover the cover being installed on the second receiving portion so as to fix the second memory medium to stably connect the terminal of the second memory medium with the second connection terminal of the second receiving portion.

12. The dual connection device as claimed in claim 8, wherein the first and second receiving portions are formed so that the first and second memory mediums are received in the first and second receiving portions, respectively, and the second memory medium is received in a direction intersecting the first memory medium.

13. The dual connection device as claimed in claim 8, wherein the first and second receiving portions are formed so that the first and second memory mediums are received parallel and opposite to each other in the first and second receiving portions, respectively.

14. A mobile communication terminal, including a dual connection device for memory mediums, the connection device comprising:
a body portion electrically connected with a mobile communication terminal;
a first receiving portion formed in the body portion for receiving therein a first memory medium;
a second receiving portion formed in the body portion as to be arranged piled up to the first receiving portion for receiving therein a second memory medium;
a first connection terminal so as to be electrically connected with a terminal of the first memory medium received in the first receiving portion; and
a second connection terminal so as to be electrically connected with a terminal of the second memory medium received in the second receiving portion wherein an upper surface of the body portion separates said first and second receiving portions.

15. The mobile communication terminal as claimed in claim 14, wherein the first and second connection terminals are formed in a space between the first and second receiving portions piled up each other.

16. The mobile communication terminal as claimed in claim 14, wherein the connection device further comprises first and second connection lead terminals electrically connected with the first and second connection terminals, respectively, and installed to be protruded a certain length from the body portion so as to electrically connect the body portion and the mobile communication terminal.

17. The mobile communication terminal as claimed in claim 16, wherein the dual connection device is installed so that the first receiving portion is exposed at a side of the mobile communication terminal and the second receiving portion is exposed at a back surface of the mobile communication terminal.

18. The mobile communication terminal as claimed in claim 14, wherein the dual connection device is located on a printed circuit board in the mobile communication terminal, the first receiving portion being exposed through the sidewall of the mobile communication terminal and the second receiving portion being exposed through a back cover of the mobile communication terminal without a battery pack.

19. A mobile communication terminal, including a dual connection device for memory mediums, the connection device comprising:
a body portion electrically connected with a mobile communication terminal;
a first receiving portion formed in the body portion for receiving therein a first memory medium;
a second receiving portion formed in the body portion as to be arranged piled up to the first receiving portion for receiving therein a second memory medium;
a first connection terminal so as to be electrically connected with a terminal of the first memory medium received in the first receiving portion; and
a second connection terminal so as to be electrically connected with a terminal of the second memory medium received in the second receiving portion
wherein a partition plate is formed in the space between the first and second receiving portions and which has at least one through-hole,
wherein the first connection terminal is installed to extend from a sidewall of the body portion corresponding to the terminal of the first memory medium, and
wherein the second connection terminal is installed to extend from a side surface of the through-hole or the sidewall of the body portion corresponding to the terminal of the second memory medium.

20. A dual connection device for memory mediums comprising:
a body portion electrically connected with a mobile communication terminal;
a first receiving portion formed in the body portion for receiving therein a first memory medium, the first receiving portion including an opening formed on one side of the body portion and a receiving space formed in the body portion, the receiving space being in communication with the opening;
a second receiving portion formed in the body portion for receiving therein a second memory medium, the second receiving portion including a pair of guide engagement members for guiding movement of the second memory medium, the guide engagement members being installed spaced apart and opposite to each other, and a stopper formed at one end of the guide engagement member for restricting movement of the second memory medium;
a plurality of first connection terminals installed on an inner surface of the receiving space so as to be electrically connected with terminals of the first memory medium received in the first receiving portion, the first connection terminals being protruded by a certain height from the inner surface of the receiving space so as to electrically connect with the terminals of the first memory medium;

a plurality of second connection terminals so as to be electrically connected with terminals of the second memory medium received in the second receiving portion;

first and second connection lead terminals electrically connected with the first and second connection terminals, respectively, and installed such that the first and second connection lead terminals are protruded a certain length from the body portion so as to electrically connect the body portion and the mobile communication terminal; and a cover being installed on the second receiving portion so as to fix the second memory medium to stably connect the terminal of the second memory medium with the second connection terminal of the second receiving portion, wherein an upper surface of the body portion separates said first and second receiving portions.

21. The dual connection device of claim 20, wherein the first and second memory mediums are received in the body portion in opposite horizontal directions or the second memory medium is received in a direction intersecting the first memory medium, wherein the cover is made of an insulating material, and wherein the first and second connection lead terminals, and the first and second connection terminals are made of a conductive material.

22. A dual connection device for memory mediums comprising:

a body portion electrically connected with a mobile communication terminal;

a first receiving portion formed in the body portion for receiving therein a first memory medium;

a second receiving portion formed in the body portion for receiving therein a second memory medium;

a partition plate installed in said body portion to define the first and second receiving portions into higher and lower receiving portions, the first and second receiving portions are formed in recessed shapes on lower and upper surfaces, respectively, of the body portion with respect to the partition plate;

a plurality of through-holes formed in parallel on the partition plate at positions corresponding to the terminals of the second memory medium;

a plurality of first connection terminals installed on the first receiving portion so as to be electrically connected with terminals of the first memory medium received in the first receiving portion, the first connection terminals being protruded by a certain height from an inner sidewall of the body portion such that a contact thereof is of a height substantially identical to a lower surface of the partition plate upon electrical connection of the first connection terminals with the terminals of the first memory medium;

a plurality of second connection terminals, some of the second connection terminals being installed to extend from a side surface of the through-hole toward inside the through-hole and other of the second connection terminals being installed to extend from the inner sidewall of the body portion toward the second receiving portion such that contacts thereof are formed with a height substantially identical to an upper surface of the partition plate upon electrical connection of the second connection terminals with the terminals of the second memory medium;

first and second connection lead terminals electrically connected with said first and second connection terminals, respectively, and installed such that said first and second connection lead terminals are protruded a certain length from the body portion so as to electrically connect the body portion and the mobile communication terminal; and a cover being installed on an upper portion of the second receiving portion so as to fix the second memory medium to stably connect the terminal of the second memory medium with the second connection terminal of the second receiving portion.

* * * * *